United States Patent [19]

Kim

[11] Patent Number: 5,481,370

[45] Date of Patent: Jan. 2, 1996

[54] APPARATUS FOR DISCRIMINATING AUDIO SIGNALS

[75] Inventor: Soon-tae Kim, Gumi, Rep. of Korea

[73] Assignee: Samsung Electronics Co., Ltd., Kyungki-Do, Rep. of Korea

[21] Appl. No.: 103,240

[22] Filed: Aug. 9, 1993

[30] Foreign Application Priority Data

Aug. 7, 1992 [KR] Rep. of Korea ............... 1992-14196

[51] Int. Cl.⁶ .................................. H04N 5/92
[52] U.S. Cl. .................. 358/341; 358/343; 348/460; 348/482; 360/19.1
[58] Field of Search .................. 358/343, 341, 358/147, 143, 153, 154; 360/19.1; 348/460, 461, 465, 473, 476, 477, 478, 479, 480, 481, 482, 483, 484, 525, 529; H04N 5/91, 5/92

[56] References Cited

U.S. PATENT DOCUMENTS

| | | | |
|---|---|---|---|
| 4,387,396 | 6/1983 | Tanaka et al. | 348/529 |
| 4,442,461 | 4/1984 | Shirai et al. | 358/343 |
| 4,446,488 | 5/1984 | Suzuki | 348/481 |
| 4,479,150 | 10/1984 | Ilmer et al. | 348/480 |
| 4,499,503 | 2/1985 | Suzuki | 358/343 |
| 4,583,132 | 4/1986 | Nakano et al. | 358/343 |
| 4,665,431 | 5/1987 | Cooper | 348/480 |
| 4,703,369 | 10/1987 | Moriyama et al. | 358/343 |
| 4,780,758 | 10/1988 | Lin et al. | 348/484 |
| 4,792,853 | 12/1988 | Yamagishi et al. | 358/153 |
| 4,965,674 | 10/1990 | Nagasawa et al. | 360/19.1 |
| 5,257,253 | 10/1993 | Otsubo et al. | 358/342 |
| 5,260,790 | 11/1993 | Takayama | 358/153 |
| 5,359,463 | 10/1994 | Shirochi et al. | 358/343 |

FOREIGN PATENT DOCUMENTS

| | | | |
|---|---|---|---|
| 402992 | 12/1990 | European Pat. Off. | H04N 7/087 |
| 117837 | 7/1984 | Japan | H04K 1/00 |
| 303585 | 12/1988 | Japan | H04N 5/91 |
| 243385 | 8/1992 | Japan | H04N 5/91 |

Primary Examiner—James J. Groody
Assistant Examiner—Chris Grant
Attorney, Agent, or Firm—Sughrue, Mion, Zinn, Macpeak & Seas

[57] ABSTRACT

An audio signal discrimination apparatus for use in a recording and reproducing apparatus, in which an identification code is inserted into a video signal and a mode of audio signal is discriminated. The audio signal discrimination apparatus includes a sync separator for separating a horizontal sync signal and a vertical sync signal from the video signal, an identification code insertion circuit for receiving the separated horizontal and vertical sync signals so as to insert an identification code for discriminating a processing mode of the audio signal into a predetermined region of the video signal when recording, and an identification code detection circuit for detecting the identification code inserted into the predetermined region of the video signal so as to determine the processing mode of the audio signal. Thus, during the reproducing procedure, the reliability of detection with respect to the audio signal can be enhanced, and the identification of the recording mode of the audio signal can be obtained more quickly.

6 Claims, 6 Drawing Sheets

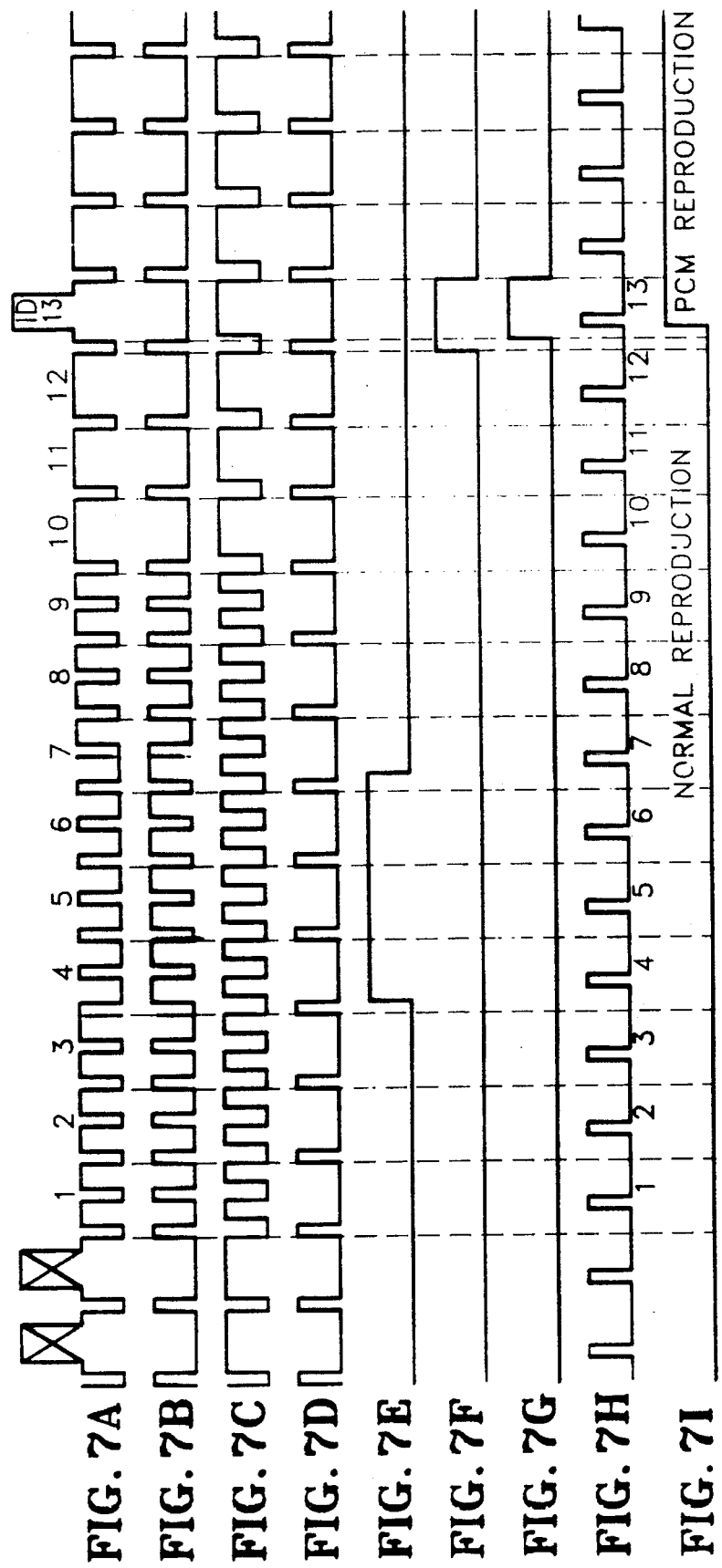

APPARATUS FOR DISCRIMINATING AUDIO SIGNALS

FIELD OF THE INVENTION

The present invention relates to an audio signal discrimination apparatus for use in a recording and reproducing apparatus, and more specifically, to an audio signal discrimination apparatus for inserting an identification code into a video signal so as to discriminate a mode of an audio signal.

BACKGROUND OF THE INVENTION

Generally, the recording and reproducing apparatus is for recording and reproducing a video and/or an audio signal, in which a video tape recorder (VTR), an audio set, a digital audio tape recorder, a laser disk player, a camcorder, etc., can be exemplified. Among these, the hi-fi recording and reproducing apparatus which records and reproduces a video and an audio signal using a magnetic tape as a recording medium records first an audio signal and then a video signal on the same track during the recording procedure. Therefore, the audio signal is recorded on the substratum of the track and the video signal is recorded on the superstratum of the track, that is, on the upper portion with respect to that of the audio signal.

FIG. 1 is a block diagram of a prior art system for reproducing the video signal and audio signal, for example, the conventional VTR. First, in reproducing the video signal, video signal information which is recorded on a magnetic tape 10 is picked up by a video reproducing head 11a, and the output signal is amplified as a predetermined amplification factor in a pre-amplifier 12a. The amplified signal is demodulated through a video signal demodulator 14 and is output into a desired video signal.

Audio signal information recorded on magnetic tape 10 can be recorded by three methods, that is, using a pulse code modulation (PCM) signal method, an audio frequency modulation (AFM) signal method, or a linear modulation (LM) signal method. The PCM signal or the AFM signal is picked up through an audio reproducing head 11b and then is amplified by a predetermined amplification factor in a pre-amplifier 12b. The amplified signal passes through filters 13a and 13b, so that only those frequencies in a predetermined band are passed and the rest of the signal is attenuated. The signal output from filters 13a and 13b is input to a PCM demodulator 15, an envelope detector 16, and an AFM demodulator 17, respectively. Here, envelope detector 16 determines whether the signals output from filters 13a and 13b are PCM signals or AFM signals according to their respective frequency domains. In case of the PCM signal, an output selection circuit 19 is connected to PCM demodulator 15 so as to output the demodulated PCM signal as an audio signal. In case of the AFM signal, the output selection circuit 19 is connected to AFM demodulator 17 so as to output the demodulated AFM signal as the audio signal. However, as shown in a cross-sectional view of the magnetic tape of FIG. 2, since the PCM signal and the AFM signal are recorded on the substratum of the tape, when the audio signal is reproduced, the magnitude of the envelope is very small. Therefore, since the gain of envelope detector 16 should be considerably large, the design of the apparatus is difficult and the time constant has not been easily determined. Also, when the magnitude of the envelope is too small, even though its amplitude has been adjusted in envelope detector 16, the probability of error generation is high and error detection is slow.

SUMMARY OF THE INVENTION

Therefore, it is an object of the present invention to provide an audio signal discrimination apparatus for inserting an identification (ID) code into a video signal which is easily detected so as to discriminate a mode of an audio signal output.

To accomplish the above object, the present invention provides an audio signal discrimination apparatus for use in a recording and reproducing apparatus for recording and reproducing a video and an audio signal using a magnetic tape as a recording medium, the audio signal discrimination apparatus comprising:

a sync separator for separating a horizontal sync signal and a vertical sync signal from the video signal;

an identification code insertion circuit for receiving the separated horizontal and vertical sync signals so as to insert an identification code for discriminating a processing mode of the audio signal into a predetermined region of the video signal when recording: and an identification code detection circuit for detecting the identification code inserted into the predetermined region of the video signal so as to determine the processing mode of the audio signal when reproducing.

The audio signal discrimination apparatus according to the present invention receives the horizontal and vertical sync signals separated from the sync separator in order to designate a region to record an audio identification code which is inserted into a predetermined region of the video signal, during a recording procedure. During a reproduction procedure, the inserted identification code is detected and the processing mode of the audio signal is determined. Accordingly, the reliability of the detection of the processing mode of the audio signal is improved and, at the same time, the time required to recognize the processing mode of the audio signal is reduced.

BRIEF DESCRIPTION OF THE DRAWINGS

Further features and advantages will become more apparent from the following and more particular description of the preferred embodiment of the invention as illustrated in the accompanying drawings in which the same reference characters generally refer to like parts throughout the views, and in which:

FIGS. 7A through 7I are waveform diagrams of the respective portions shown in FIGS. 5 and 6.

DETAILED DESCRIPTION OF THE PREFERRED EMBODIMENT

An operation of one embodiment of the present invention will be described below with reference to the accompanying drawings.

Figure 1:
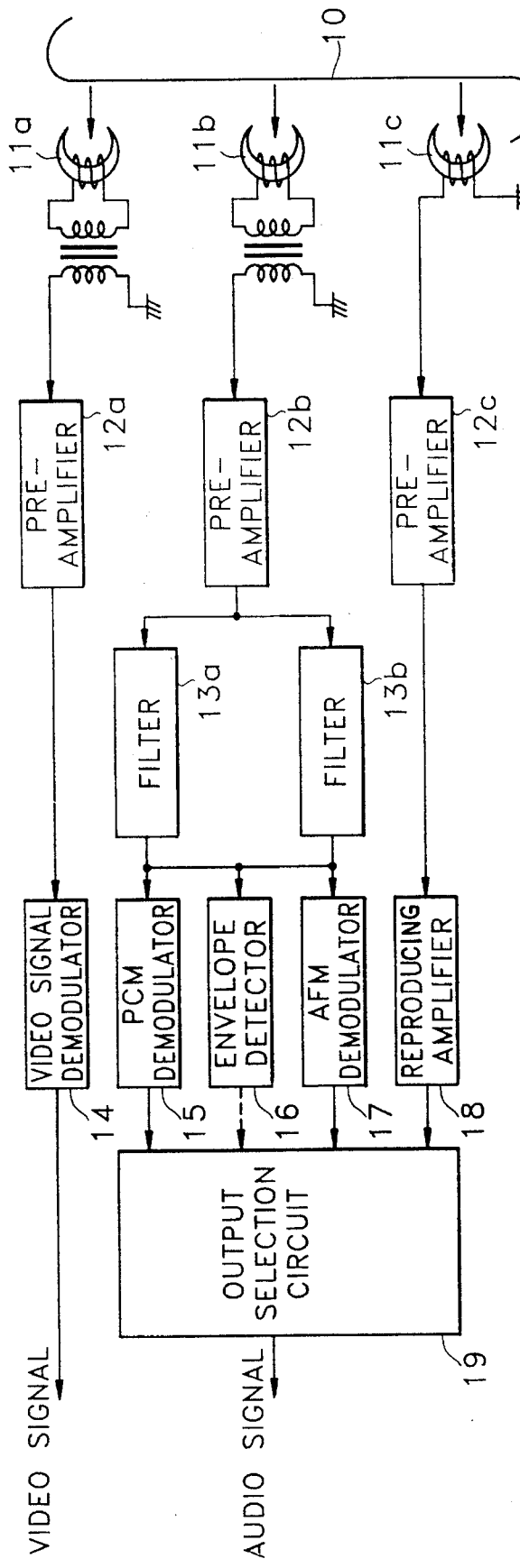
FIG. 1 is a block diagram of prior art.
Figure 2:
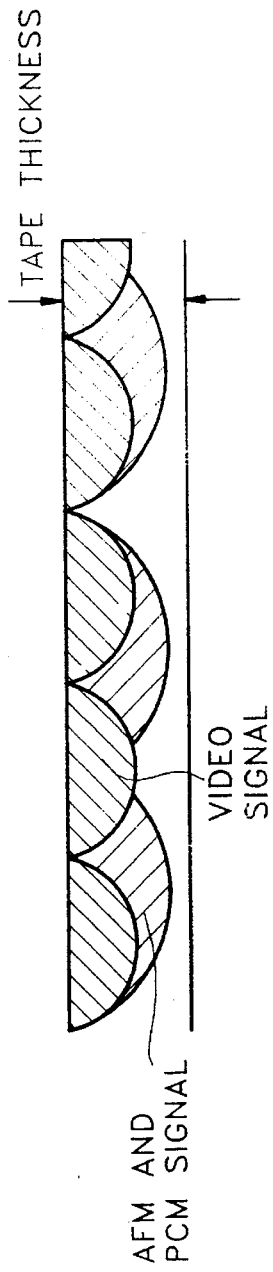
FIG. 2 is a cross-sectional view of a magnetic tape on which the audio signal is deeply recorded.
Figure 3:
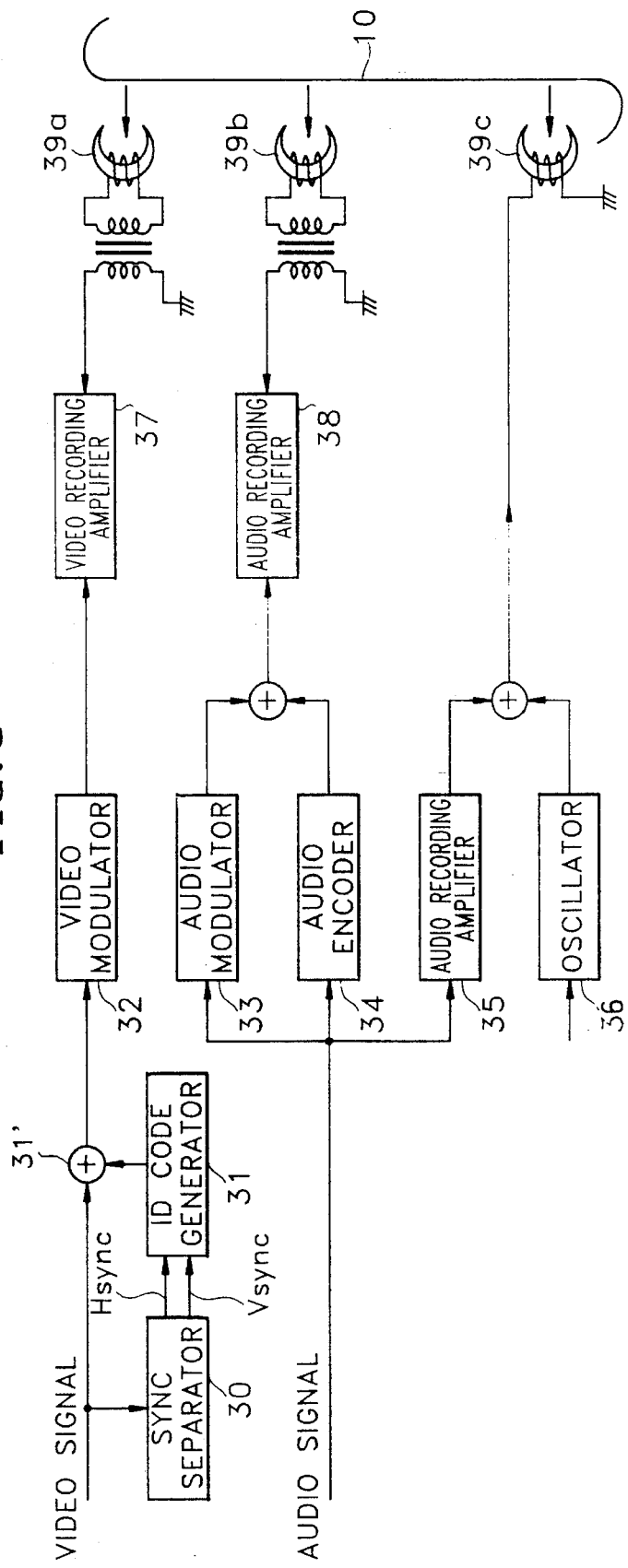
FIG. 3 is a system block diagram of the apparatus according to the present invention when recording.

FIG. 3 is a block diagram of a recording system in which an insertion circuit for inserting an identification code into a video signal is added. In FIG. 3, an audio signal applied from an external source is modulated by an audio modulator 33 when recording by means of an AFM signal processing mode, is encoded by an audio encoder 34 when recording by means of a PCM signal processing mode, and is amplified by a recording amplifier 35 when recording by means of an LM signal processing mode.

The AFM signal and the PCM signal are amplified by a recording amplifier 38 and the amplified signal is recorded on magnetic tape 10 through an audio recording head 39b. The LM signal is mixed with an oscillation wave output from an oscillator 36 so as to be recorded on magnetic tape 10 by an audio recording head 39c.

A video signal applied from an external source is separated into a horizontal sync signal and a vertical sync signal in sync separator 30. An identification code generation circuit 31 receives the separated horizontal sync signal and the vertical sync signal as input signals so as to match the time to be recorded by means of the AFM signal processing mode or the PCM signal processing mode when recording the audio signal, thereby generating an identification code. The generated identification code is inserted into the video signal applied from the external source in an adder 31' so as to then be modulated by video modulator 32. The modulated signal is amplified in video recording amplifier 37 so as to be recorded on magnetic tape 10 by a video recording head 39a.

Figure 4:
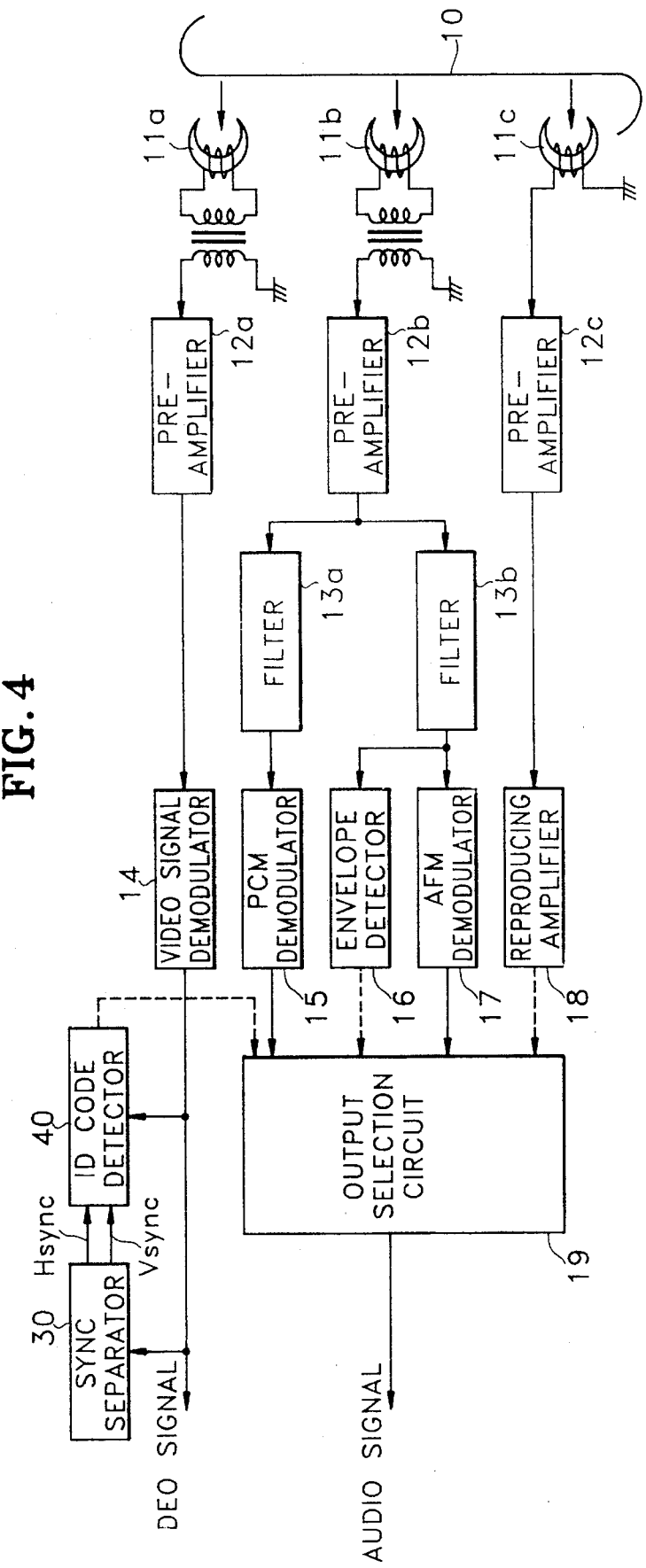
FIG. 4 is a system block diagram of the apparatus according to the present invention when reproducing.

FIG. 4 is a system block diagram when reproducing according to the present invention.

In FIG. 4, video signal information recorded on magnetic tape 10 is picked tip by a video reproducing head 11a so as to be input in a preamplifier 12a. Pre-amplifier 12a amplifies the picked-up signal by a predetermined amplification factor so as to supply the amplified signal to a video signal demodulator 14. Video signal demodulator 14 demodulates the amplified signal so as to be output as the video signal. Here, the video signal is input to a sync separator 30 so as to be separated into the horizontal sync signal and the vertical sync signal as in the case of recording the video signal. The separated horizontal sync signal and vertical sync signal are input to an identification code detection circuit 40 so as to detect the identification code inserted into the video signal.

When the audio signal is reproduced, audio signal information recorded by means of the PCM signal processing mode and of the AFM signal processing mode is picked up by an audio reproducing head 11 b so as to be amplified by a predetermined amplification factor in a pre-amplifier 12b, thereby supplying the pre-amplified signal to filters 13a and 13b. The amplified signal passes through tillers 13a and 13b, so that only those frequencies in a predetermined band are passed and the rest of the signal is attenuated. The signal output from filters 13a and 13b is input to a PCM demodulator 15 and an AFM demodulator 17, respectively. Here, while the video signal is reproduced, identification code detection circuit 40 detects the identification code, thereby determining that the currently reproduced audio signal is recorded by means of the PCM signal processing mode, and if the envelope is detected from envelope detector 16, it is determined that the currently reproduced audio signal is recorded by AFM signal processing. In case of the PCM signal processing mode, output selector 19 selects PCM demodulator 15. In case of the AFM signal processing mode, output selector 19 selects AFM demodulator 17. PCM demodulator 15 demodulates the signal output from filter 13a so as to be output as the audio signal via output selector 19. AFM demodulator 17 demodulates the signal output from filter 13b so as to be output as an audio signal via output selector 19.

If neither the identification code nor the envelope is detected, then the currently reproduced audio signal is determined to be recorded by the LM signal processing mode. Audio signal information recorded on magnetic tape 10 by means of LM signal processing mode is picked up by audio reproducing head 11c so as to be amplified in a pre-amplifier 12c and a reproducing amplifier 18. The amplified signal is output as an audio signal through output selector 19.

Figure 5:
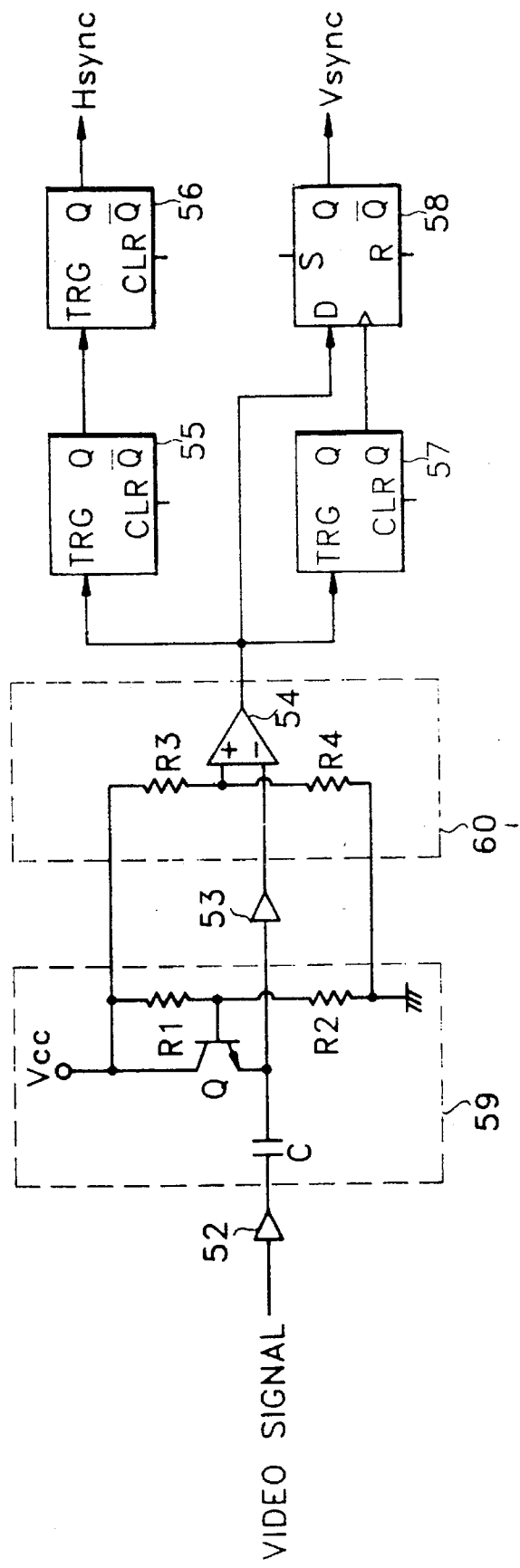
FIG. 5 is a circuitry diagram of one embodiment of a sync separator which is adapted in the present invention.

FIG. 5 represents one specific embodiment of sync separator 30 shown in FIGS. 3 and 4. Sync separator 30 comprises a clamp circuit 59 for obtaining a video signal of which the lower portion has a uniform level, a comparator 60 for generating a composite sync signal from the clamped video signal, a first monostable multivibrator 55 and a second monostable multivibrator 56 for generating a horizontal sync signal from the composite sync signal, a third monostable multivibrator 57 and a first D flip-flop 58 for generating a vertical sync signal.

Figure 6:
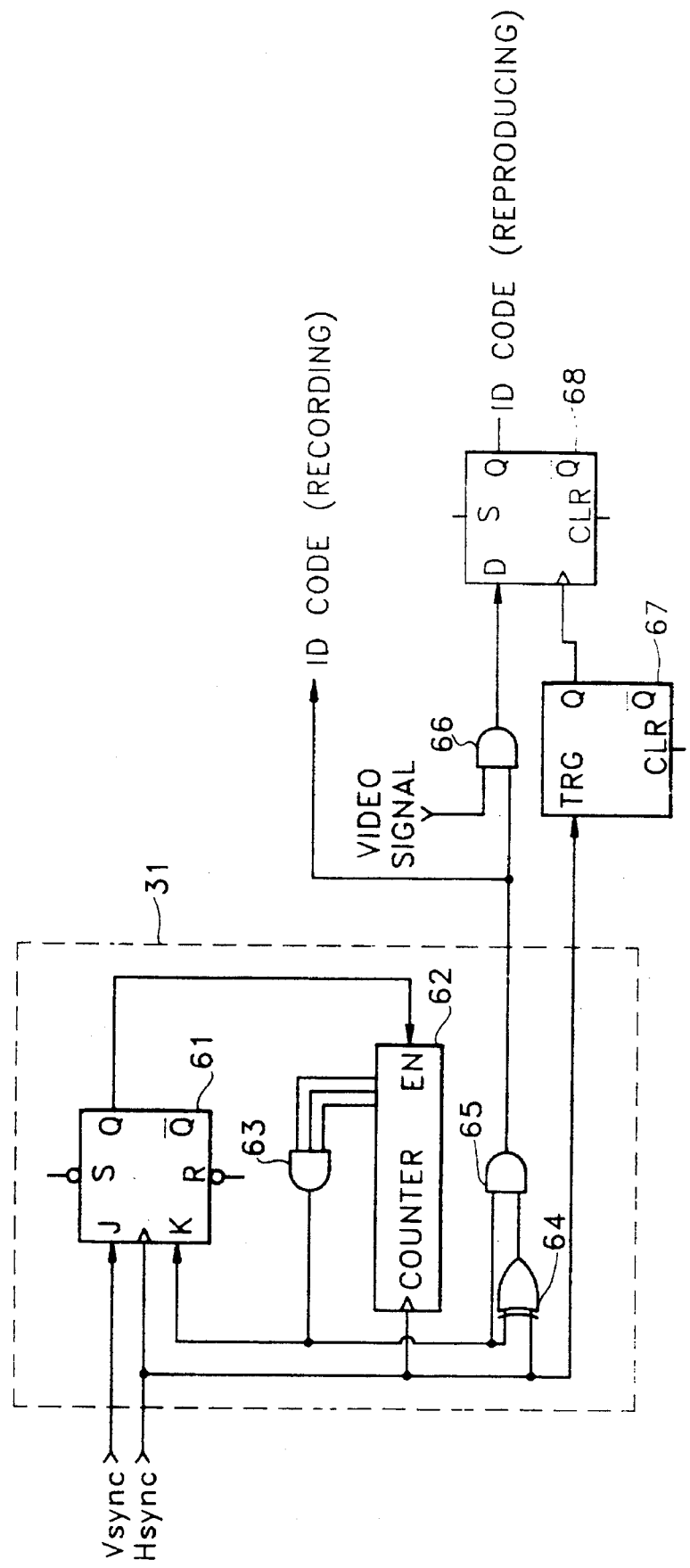
FIG. 6 is a circuitry diagram of one embodiment of an identification code insertion circuit and an identification code detection circuit which are adapted in the present invention.

FIG. 6 represents one specific embodiment of an identification code insertion circuit 31 and an identification code detection circuit 40 shown in FIGS. 3 and 4. An identification code generation circuit 31 comprises a JK flip-flop 61, a counter 62, two AND gates 63 and 65, and an exclusive OR gate 64. Identification code detection circuit 40 is constructed by adding an AND gate 66, a fourth monostable multivibrator 67 and a second D flip-flop 68 to the above identification code generation circuit 31.

FIGS. 7A through 7I are waveform diagrams of the respective portions shown in FIGS. 5 and 6, when reproducing an audio signal recorded by means of the PCM signal processing mode. FIG. 7A represents the video signal generated from clamp circuit 59, FIG. 7B shows the composite sync signal generated from comparator 60, FIG. 7C shows the output waveform of third monostable multivibrator 57, FIG. 7D shows the horizontal sync signal, FIG. 7E shows the vertical sync signal, FIG. 7F shows the output waveform of AND gate 63, FIG. 7G shows the identical cation code generated from AND gate 65, FIG. 7H shows the output waveform of fourth monostable multivibrator 67, and FIG. 7I shows the reproduced waveform of the audio signal of the PCM signal processing mode.

Then, operations of FIGS. 5 and 6 will be described in connection with FIGS. 7A through 7I.

The video signal applied frown the external source is input to clamp circuit 59 through a buffer 52. Buffer 52 can be replaced by a transistor as a means for matching impedance between the video signal and the input terminal of clamp circuit 59. The signal generated from buffer 52 is input to a capacitor C in clamp circuit 59. According to voltage distribution of supply voltage $V_{cc}$ by the dividing network of resistors R1 and R2, a fixed bias voltage is applied to the base of transistor Q. Here, the fixed bias voltage is $R_2/(R_1+R_2) \times V_{cc}$ and plays the role of a clamping potential. Capacitor C is charged until the difference of the video signal potential and the clamping potential becomes maximum. When the charge is completed, transistor Q is turned off and the sum of potentials of the video signal and of capacitor C is output to buffer 53, and in doing so, the negative peak is clamped by the clamping potential. Accordingly, a video signal whose lower portion is flat is output as shown in FIG. 7A.

The signal generated from clamp circuit 59 is input to buffer 53. Buffer 53 can be replaced by a transistor as a means for matching the impedance between clamp circuit 59 and comparator 60. The signal generated from buffer 53 is input to the inverting terminal of comparator 60. The potential obtained by the voltage distribution of the power supply voltage $V_{cc}$ by voltage distribution resistors R3 and R4 is input to the non-inverting terminal of comparator 60. Thus, the non-inverting terminal of comparator 60 is established as a reference level. Comparator 60 compares the voltages at its intput terminals and if the result is negative, generates a logic high output signal. Conversely, if the compared result is positive, comparator 60 generates a logic low output signal. Thus, comparator 60 generates a composite sync signal from which the video signal and the identification code are removed, as shown in FIG. 7B.

The composite sync signal output from comparator 60 is input to the trigger terminals (TRG) of first monostable multivibrator 55 and third monostable multivibrator 57, and the data terminal (D) of first D flip-flop 58, respectively. First monostable multivibrator 55 regulates the pulse width by a predetermined time constant and inputs the pulse-width-regulated signal to the trigger terminal of second monostable multivibrator 56. Second monostable multivibrator 56 again regulates the pulse width by a predetermined time constant and generates a regulated signal. Thus, first and second monostable multivibrators 55 and 56 remove the vertical sync signal and the equalizing pulse from the composite sync signal, and generate a horizontal sync signal as shown in FIG. 7D.

Third monostable multivibrator 57 regulates the pulse width and generates the complementary value. The signal output from third monostable multivibrator 57 is input to the clock terminal of first D flip-flop. When the composite sync signal is high, first D flip-flop 58 operates to generate a high output level according to application of the clock pulse, and when the composite sync signal is low, likewise operates to generate a low output level. First D flip-flop 58 keeps the preceding state with respect to the rest of the signal operations. Thus, first D flip-flop 58 generates the vertical sync signal from the composite sync signal according to the clock pulse output from third monostable multivibrator 57 as shown in FIG. 7E. The horizontal sync signal output from sync separator 30 is input to the clock terminals of JK flip-flop 61 and counter 62, and an input of exclusive-OR gate 64. The output of JK flip-flop 61 is dependent upon the values of J and K. Given that the value of the previous state of JK flip-flop 61 is a logic high and the value of (J,K) is (0,0), JK flip-flop 61 generates a logic high. If the value of (J,K) is (0,1), JK flip-flop 61 generates a logic low. The output of JK flip-flop 61 enables counter 62. Counter 62 is designed to generate a three-bit binary value of one through seven (001–111). When the output of counter 62 is seven (111), the value of AND gate 63 becomes a logic high. The output waveform of AND gate 63 is shown in FIG. 7F. The high logic value output from AND gate 63 is input to the K input of JK flip-flop 61 so as to set the following state of JK flip-flop 61 to be a logic low. Since the value output from AND gate 63 is a logic high, exclusive-OR gate 64 generates a logic high only when the horizontal sync signal is low. Since both inputs of AND gate 65 are high, AND gate 63 generates a logic high. The signal output from AND gate 65 is an identification code and inserted into a region where a predetermined video signal is recorded.

The identification code output from the identification code generation circuit 31 and the video signal are input to AND gate 66. If the identification code is inserted into the video signal, AND gate 66 generates a logic high. The value output from AND gate 66 is input to the data terminal of second D flip-flop 68. Fourth monostable multivibrator 67 delays the horizontal sync signal by a half period. The delayed signal is input to the clock terminal of second D flip-flop 68. According to the counting of the clock, second D flip-flop 68 transfers the input logic value of the data. When the data is a logic high, an identification code is generated, to delay the horizontal sync signal by a half period compared with the time base of the input of the identification code. The horizontal sync signal is delayed by a half period to reduce the error generation, by matching the identification code generated from second D flip-flop 68 with the center portion of the identification code recorded on the video signal. The recorded audio signal mode is determined using the identification code generated from second D flip-flop 68, thereby generating the properly processed audio signal. If the audio signal is recorded on recording tape 10 by the PCM signal processing mode, the audio signal of the PCM signal processing mode is reproduced at the start point where the identification code is output as shown in FIG. 7I. Thereafter, with the detection of the envelope, the AFM-signal-processed audio signal is reproduced, and the LM-signal-processed audio signal is reproduced if neither the identification code nor envelope is detected.

As described above, the present invention inserts a code for identifying an audio signal into a video signal during a recording procedure, and detects the inserted identification code during a reproducing procedure, so as to control a processing mode of the reproduced audio signal. Accordingly, during the reproducing procedure, the reliability of detection with respect to the audio signal can be enhanced, and the identification of the recording mode of the audio signal can be obtained more quickly.

What is claimed is:

1. An audio signal discrimination apparatus for use in a recording and reproducing apparatus for recording and reproducing a video and an audio signal using a magnetic tape as a recording medium, said audio signal discrimination apparatus comprising:

a sync separator for separating a horizontal sync signal and a vertical sync signal from the video signal;

an identification code insertion circuit for receiving the separated horizontal and vertical sync signals so as to insert an identification code for discriminating a processing mode of the audio signal into a predetermined region of the video signal when recording; and an identification code detection circuit for detecting the identification code inserted into the predetermined region of the video signal so as to determine the processing mode of the audio signal when reproducing, wherein said identification code insertion circuit comprises a counter for counting the horizontal and vertical sync signals output from said sync signal separator and setting a position where said identification code is inserted, and logic means for logically combining the output of said counter and said horizontal sync signal and generating said identification code for said recording medium.

2. The audio signal discrimination apparatus according to claim 1, wherein said logic means comprises a first logic device for exclusive-O-Ring the output signal of said counter and said horizontal sync signal, and a second logic device for logically multiplying an output signal of said first logic device and the output signal of said counter.

3. An audio signal discrimination apparatus for use in a recording and reproducing apparatus for recording and reproducing a video and an audio signal using a magnetic tape as a recording medium, said audio signal discrimination apparatus comprising:

a sync separator for separating a horizontal sync signal and a vertical sync signal from the video signal;

an identification code insertion circuit for receiving the separated horizontal and vertical sync signals so as to insert an identification code for discriminating a processing mode of the audio signal into a predetermined region of the video signal when recording; and an identification code detection circuit for detecting the identification code inserted into the predetermined region of the video signal so as to determine the processing mode of the audio signal when reproducing, wherein said identification code detection circuit comprises a logic device for logically multiplying said identification code which is recorded on the video signal and said identification code inserted from said identification code inserted circuit, and a flip-flop for receiving the signal output from said logic device and a signal which delays said horizontal sync signal by a predetermined period of time as a clock, and detecting said identification code.

4. The audio signal discrimination apparatus according to claim 3, wherein said identification code detection circuit further comprises a monostable multivibrator for delaying said horizontal sync signal input to said flip-flop by a half of a period, compared with a time base of an input to said identification insertion circuit.

5. An audio signal discrimination apparatus in a recording and reproducing apparatus for recording and reproducing a video signal and an audio signal, said audio signal discrimination apparatus comprising:

an identification code generator for generating a code for identifying an audio processing mode in response to horizontal and vertical sync signals separated from the video signal;

insertion means for inserting the generated code into the video signal; and a recording head for recording the video signal with the inserted code on a recording medium, wherein said apparatus for recording and reproducing the video signal and the audio signal includes processing means for processing the audio signal according to one of a pulse code modulation (PCM) signal operation, an audio frequency modulation (AFM) signal operation, and a linear modulation (LM) signal operation, and wherein said insertion means inserts the code into video signal only when said processing means processes the audio signal according to one of said PCM signal and said AFM signal operations.

6. The audio signal discrimination apparatus as claimed in claim 5, further comprising detection means for detecting the code inserted in the video signal.

* * * * *